(No Model.) 2 Sheets—Sheet 1.

J. S. GRAHAM & J. KANE.
RE-SAWING MACHINE.

No. 508,515. Patented Nov. 14, 1893.

Witnesses:
H. G. Phillips.
Theo. L. Popp.

Inventors:
James S. Graham
and John Kane,
By their Attorney
Geo. B. Selden.

(No Model.) 2 Sheets—Sheet 2.
J. S. GRAHAM & J. KANE.
RE-SAWING MACHINE.
No. 508,515. Patented Nov. 14, 1893.
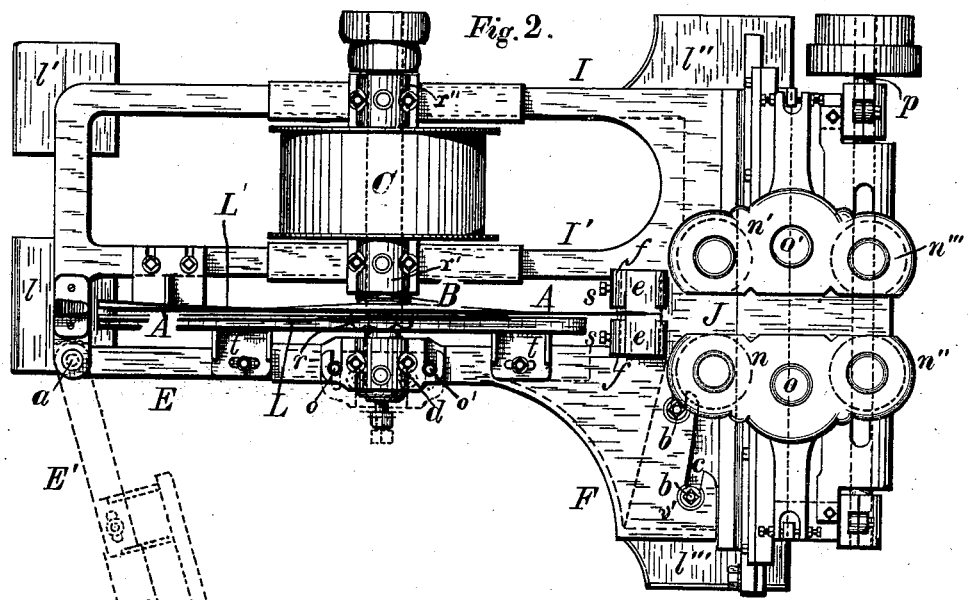
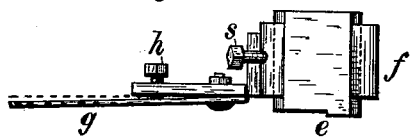
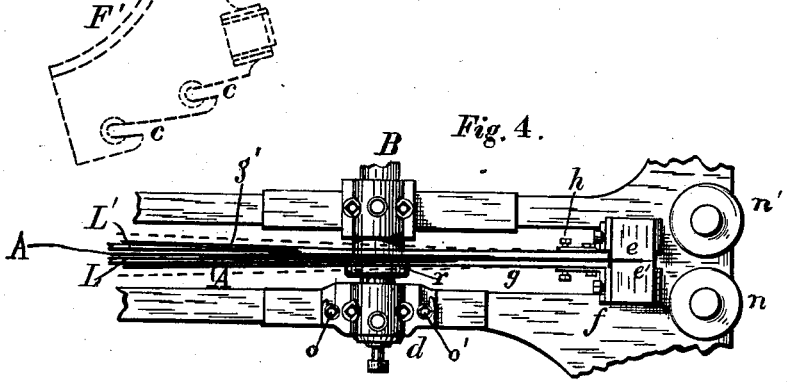
Witnesses:
H. G. Phillips.
Theo. L. Popp.
Inventors:
James S. Graham and
John Kane,
By their Attorney
Geo. B. Selden.
THE NATIONAL LITHOGRAPHING COMPANY,
WASHINGTON, D. C.

UNITED STATES PATENT OFFICE.

JAMES S. GRAHAM AND JOHN KANE, OF ROCHESTER, NEW YORK, ASSIGNORS TO J. S. GRAHAM & CO., OF SAME PLACE.

RESAWING-MACHINE.

SPECIFICATION forming part of Letters Patent No. 508,515, dated November 14, 1893.

Application filed March 26, 1889. Serial No. 304,849. (No model.)

*To all whom it may concern:*

Be it known that we, JAMES S. GRAHAM and JOHN KANE, citizens of the United States, residing at Rochester, Monroe county, New York, have jointly invented certain Improvements in Resawing-Machines, of which the following is a specification, reference being had to the accompanying drawings.

Our invention relates to certain improvements in the frame of a resawing machine, by which the operator is enabled to obtain access to the saw for the purpose of easily removing it from the machine, and also to certain details of the construction as hereinafter more fully described.

Our said improvements are fully described and illustrated in the following specification and accompanying drawings, and the novel features thereof specified in the claims annexed to the said specification.

Our improvements in resawing machines are represented in the accompanying drawings, in which—

Figure 1:
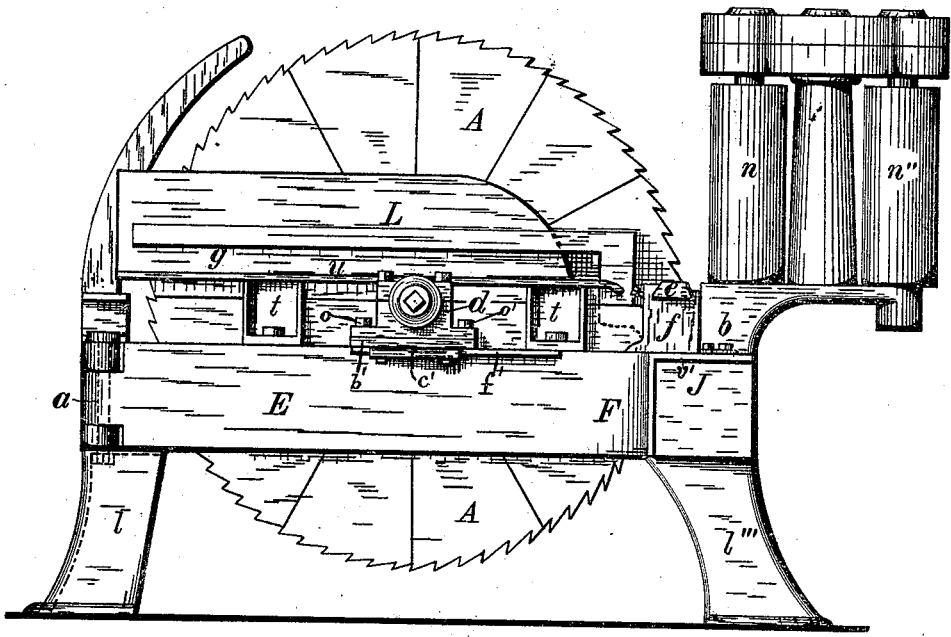
Figure 5:
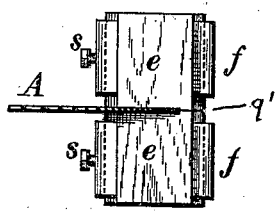

Figure 1 is an elevation. Fig. 2 is a plan view. Fig. 3 is a plan view of one of the steadying-blocks, showing its support and the box-board attachment. Fig. 4 is a partial plan view of the machine, showing the attachment employed for sawing short boards. Fig. 5 is a plan view of the steadying blocks.

In the accompanying drawings representing our improved resawing machine, A is the saw, B its shaft, C the driving pulley, and I I' J the frame work which supports the saw arbor B, and the feeding rollers $n$ $n'$ $n''$ $n'''$. The feeding rollers are of any ordinary or preferred construction and driven in any suitable manner. They are adapted to feed the boards to the saw and provision is made for feeding boards of different thicknesses and for the automatic centering of the boards to the saw. The frame work I I' J which supports the journals of the saw arbor B on each side of the pulley C, is also constructed in any usual or preferred manner, being provided with legs $l$ $l'$ $l''$ $l'''$, by which the machine is supported.

In order to prevent vibration in the saw, when running, it is desirable to support the outer end of the saw arbor outside of the saw in the journal box $d$. This requires that the frame work of the machine should be provided with a bar adapted to sustain the box $d$, but as this interferes with the removal of the saw from the arbor, we support the journal box $d$ on the movable side frame E which is hinged or pivoted at one end to the machine, and on the other end attached thereto by any suitable device. In the construction shown in the drawings, the movable side frame E is pivoted to the supporting frame or suitable projecting lugs thereon, at $a$, Figs. 1 and 2, on the rear side of the saw, so that the side frame, when its front end is detached, may be swung outward or away from the machine, as represented by the dotted lines E' F' in Fig. 2, so as to afford free access to the saw for the purpose of removing the saw from its arbor.

The saws in this class of machine are provided with a stiffening plate or plates, and being made thin at the edge, so as to reduce the waste of wood, they are very difficult to handle. By our improvement we are enabled to handle the saw easily and safely, by sliding it off its arbor, when the side frame is swung back, on to a mandrel by which it may be readily handled and transferred from place to place. The journal box $d$ may be attached to the movable side frame E so that it can be removed, in order to permit the side frame to be swung outward, but we prefer to connect it adjustably with the side frame as indicated in the accompanying drawings, in which $b'$ is an adjustable plate secured to the flange $f'$ on the side frame by means of the gib $c'$, and to which plate, the journal box $d$ is secured by the bolts $o$ $o'$, so that, when the bolts $o$ $o'$ which pass through slotted holes or recesses in the flanges on the box, are unscrewed, the box is permitted to adjust itself to a position in which it will readily slip off of the saw arbor when the side frame is swung outward. By attaching the plate $b'$ to the movable side frame by means of the gib $c'$, we are enabled to adjust the box $d$ toward the feeding rollers as the saw is worn away by use. Provision is also made for adjusting the other journal boxes $r'$ $r''$, Fig. 2, of the saw arbor toward the feeding rollers.

Any suitable device may be employed for attaching the forward end of the movable side frame E to the main frame of the machine. In the construction shown in the drawings, the side frame is provided with a flange $v'$ which rests upon the top of the cross-bar J and is provided with one or more slots $c'$, through which the clamp-screws $b$ are inserted. The saw A and its stiffening plate are secured to the arbor B by means of the nut $r$, by the removal of which the saw is permitted to be taken off the arbor.

In order to prevent the springing or buckling of the thin saws, and also to prevent splinters or knots from getting into the throat of the machine between the saw and frame and injuring the teeth, we employ the wooden steadying-blocks $e\ e$, the upper surface of which is placed on the same level with the feed plate of the machine and which project in the radial direction beyond the periphery of the saw, so as to support the board immediately in front of the points of the teeth. The blocks $e\ e$ are supported in suitable castings $f$ attached to the frame of the machine, fitted to dovetailed grooves in the upper surface in the casting so that they may be adjusted across the plane of the saw and secured in place by a set screw or other suitable device. Outside the points of the teeth of the saw, the blocks meet each other on the line $q'$, Fig. 5, thus leaving no crack or opening through which splinters or small knots can pass. As the movable side frame F is the only part of the frame of the machine on the side of the saw opposite the pulleys on the saw arbor G, we fasten the steadying block $e$, the guide-spring $g$, journal box $d$, and spreader L, to the movable side frame F, and when this frame is swung out as shown in the dotted lines in Fig. 2, it carries with it the parts $e$, $g$, $d$ and L.

In order to adapt our machine to sawing short boards, we apply on both sides the saw, the spring guides $g\ g'$, which are attached to the frame of the machine in any convenient way near the front edge of the saw, and extend backward at a suitable distance above the track $u$, and outside the spreaders L L′ to the rear of the saw so that short pieces of boards passing through between the spreaders and the spring guides, are held in position by the latter until discharged from the machine. The spring guides are made of strips of flexible metal, so that they may yield away from spreaders L L′ when the short pieces of boards pass between them. Provision is made for adjusting the tension of the spring guides $g\ g'$ by means of the adjusting screws $h$, Fig. 3, passing through arms attached to the frame of the machine and bearing on the outside of the springs.

By the use of our improved spring guides, the overlapping of the ends of the short boards, which are frequently of unequal thickness, is prevented, a difficulty which is frequently encountered when stationary outside guides are used.

We claim—

1. The combination with the main frame and saw of a resawing machine, provided with suitable journal-boxes for the saw-arbor, of a movable side-frame, hinged to the main frame at one end and detachably connected thereto at the other, and supporting a suitable steadying pin or block at and in front of the cutting edge of the saw, substantially as described.

2. The combination with the main-frame and saw of a resawing-machine, having suitable journal-boxes for the saw-arbor, of a movable side-frame, hinged to the main-frame at one end and detachably connected thereto at the other, and supporting a journal-box for the saw-arbor outside the saw, and a steadying block at the cutting edge of the saw, substantially as described.

3. The combination with the main-frame and saw of a resawing machine, having suitable journal-boxes for the saw arbor, of the movable side-frame E, pivoted to the main-frame at one end and detachably connected thereto to the other, and carrying the spreader L, and the elastic spring guide $g$, substantially as described.

4. The combination with the main-frame and saw of a resawing machine, having suitable journal-boxes for the saw-arbor, of the movable side-frame E, pivoted to the main-frame at one end and detachably connected thereto at the other, and carrying the spreader L and the steadying block $e$, substantially as described.

5. The combination with the saw and feeding rollers of a resawing machine, of the elastic spring guides, $g\ g'$, and spreaders L L′, both the guides and the spreaders extending to the rear of the saw, substantially as described.

6. The combination with the saw A, of the steadying blocks $e\ e$, arranged to be adjusted in a direction at right angles to the plane of the saw, and located partially outside of the periphery thereof and forming part of the bed of the machine, substantially as described.

7. The combination with the main-frame and saw of a resawing machine having suitable journal boxes for the saw-arbor, of the movable side frame pivoted to the main-frame at one end and detachably connected therewith and carrying the spreader L, journal box $d$ steady block $e$ and elastic spring guide $g'$ substantially as described.

J. S. GRAHAM.
JOHN KANE.

Witnesses:
W. E. REPINE,
E. A. KANE.